United States Patent
Johnson

(10) Patent No.: US 6,311,641 B1
(45) Date of Patent: Nov. 6, 2001

(54) BIRD PERCH, FEEDER, AND BATH

(76) Inventor: Mary Lou Johnson, 2865 Roundtop Rd., Alexandria, TN (US) 37012

( * ) Notice: Subject to any disclaimer, the term of this patent is extended or adjusted under 35 U.S.C. 154(b) by 0 days.

(21) Appl. No.: 09/395,691

(22) Filed: Sep. 13, 1999

(51) Int. Cl.⁷ ................................................. A01K 61/02
(52) U.S. Cl. ............................................. 119/57.8; 119/68
(58) Field of Search ............................. 119/57.8, 537, 119/70, 52.2, 52.1, 57.9, 69.5, 464, 468, 467, 469, 531; D30/119

(56) References Cited

U.S. PATENT DOCUMENTS

| | | |
|---|---|---|
| D. 76,406 * | 9/1928 | Leon ................................. D30/119 |
| D. 420,472 * | 2/2000 | Dellasandro et al. ............. D30/119 |
| 2,718,874 | 9/1955 | Dunn . |
| 4,627,384 * | 12/1986 | Courteau .............................. 119/537 |
| 4,934,319 | 6/1990 | Waltemeyer . |
| 5,218,927 | 6/1993 | Addams . |
| 5,381,758 | 1/1995 | Simon . |
| 5,632,230 | 5/1997 | Dornetta . |
| 5,634,430 | 6/1997 | Brostowicz . |
| 5,647,298 | 7/1997 | Yancy . |
| 5,711,247 | 1/1998 | Henshaw . |
| 5,819,689 | 10/1998 | Simon . |

\* cited by examiner

*Primary Examiner*—Charles T. Jordan
*Assistant Examiner*—Judith A. Nelson
(74) *Attorney, Agent, or Firm*—Waddey & Patterson; Larry W. Brantley

(57) ABSTRACT

A bird perch, feeder, and bath having a base, a pole, a feeder, a perch bar, and a catch pan. The catch pan is centrally positioned below the feeder and perch bar in order to minimize the amount of bird feed, bird waste and other materials dropping from the feeder or the perch bar to the area underneath the bird perch, feeder, and bath. The feeder and the perch bar may be selected in various sizes to accommodate different-sized birds. The catch pan is adjusted to a distance from the feeder and perch bar to ensure that the catch pan collects the maximum amount of bird feed, waste, or other materials. The feeder can be sized so that it can be used as a bath for a bird rather than a feeder.

8 Claims, 3 Drawing Sheets

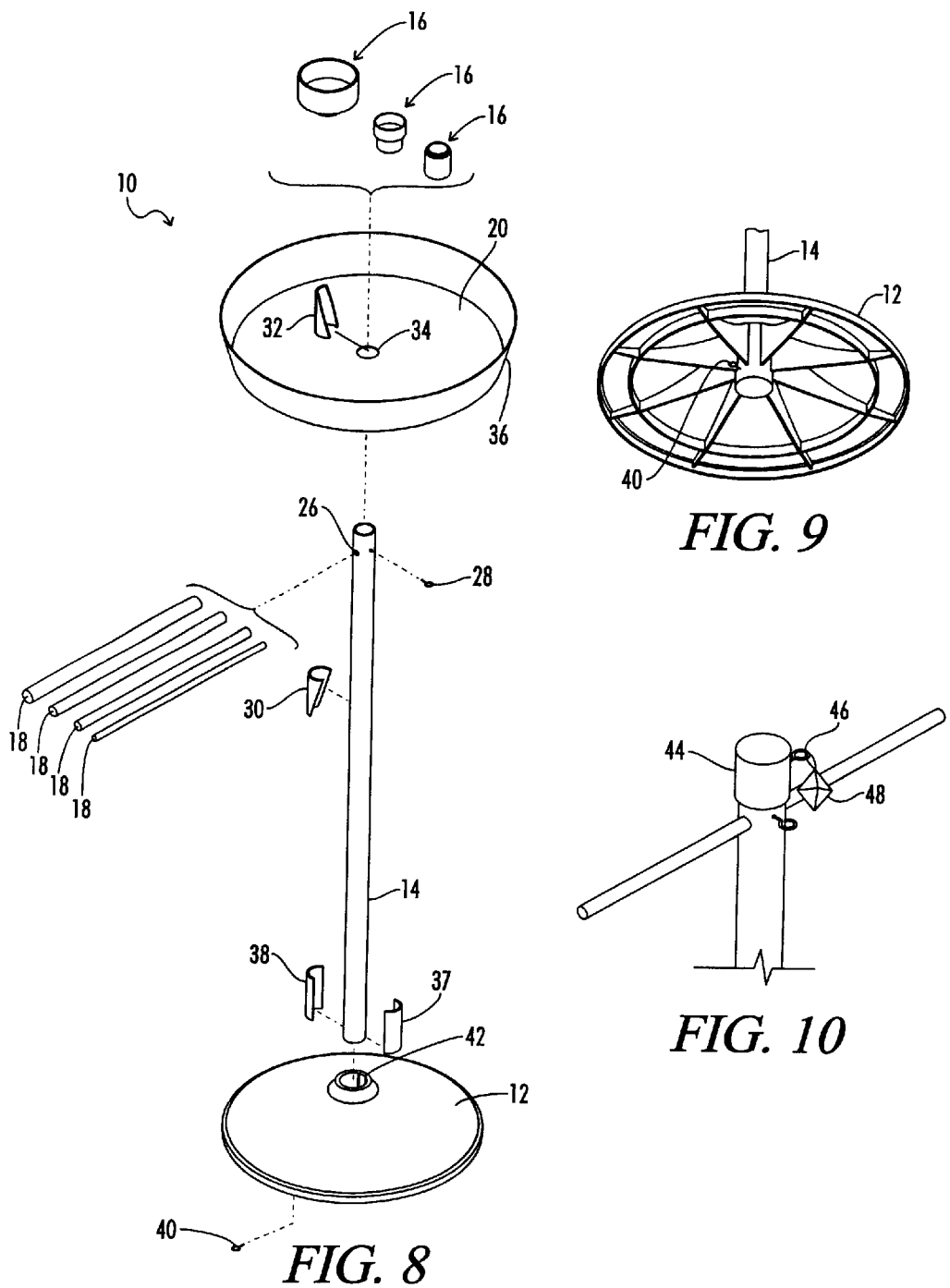

BIRD PERCH, FEEDER, AND BATH

BACKGROUND OF THE INVENTION

This invention relates to bird perches feeders, and baths and in particular, to a combination bird perch, feeder, and bath which reduces the mess that results from birds feeding and bathing by using a reusable and/or replaceable pan.

It is known that birds have a tendency to play in their food when feeding. As a result, bird feed that is held in a container is pushed out of the container by the bird and drops to the floor below.

Birds also tend to eliminate waste while sitting on a perch. This results in bird waste dropping to the floor below. In addition, if the bird is wet for whatever reason, water will drip from the bird to the floor below.

In either of the three cases, the bird feed, the bird waste, or water is deposited on the floor below the perch. This results in a mess that must be cleaned up.

There is no known combination bird perch feeder, and bath available that can be used to minimize the amount of bird feed, the amount of bird waste, or the amount of water deposited below a bird perch. While there are some existing patents relating to bird perches and feeders, none of these patents address the problems solved by the present invention. In addition, none of these patents discuss the concept of using a container as a feeder and/or a bath.

U.S. Pat. No. 5,218,927, issued to Addams on Jun. 15, 1993, describes a portable and collapsible bird perch. This bird perch comprises a base, a pole supported by said base, and a perch supported by said pole. The perch does not include a catch pan for catching any bird feed, bird waste, or any other substance that may drop from the perch.

Another patent, U.S. Pat. No. 5.632,230, issued to Dornetta, describes an animal perch and method of construction. This animal perch consists of a camera tripod, a litter tray, a support post, a horizontal perch bar, and cups. The cups are attached to either end of a horizontal perch bar. The support post supports the perch bar. The camera tripod supports the support post. The litter tray passes over the support post and rests on top of the camera tripod. While this animal perch includes a litter tray, the positioning of the cups at either end of the horizontal perch bar results in the cups being placed at the edge of the litter tray. By placing the cups at the edge of the litter tray, some of the bird feed spilling out of the cup does not land on the litter tray and falls to the ground below.

Another patent, U.S. Pat. No. 5,711,247, issued to Henshaw, on Jan. 27, 1998, described a bird feed recycler. This patent teaches an apparatus which can be used to separate bird feed and bird feces so that the bird feed can be reused. This invention cannot be used as a birdbath. In addition, this invention does not provide a reusable litter tray.

What is needed then, is a combination bird perch, feeder, and bath that allows a variety of different size birds to feed and bathe while resting or sitting on a perch bar and minimizes the mess resulting from such activity.

SUMMARY OF THE INVENTION

This invention accomplishes these and other objectives with a bird perch, feeder, and bath comprising a base; a pole supported by the base; a feeder mounted on top of the pole; a perch bar attached to the pole below the feeder; and a catch pan attached to the pole below the perch bar.

In light of the need for a bird perch which allows birds to feed and bathe while at the same time minimizing or eliminating the mess resulting from the bird feeding and bathing, objects of this invention are to provide a bird perch that:

allows a bird to feed while resting or sitting on a perch bar;

allows a bird to bathe while sitting or resting on the perch bar;

prevents bird feed and bird feces from dropping to the ground immediately below and surrounding the invention: and has different-sized perch bars and feeders for different-sized birds.

The above and other objects, features, and advantages of the present invention should become even more readily apparent to those skilled in the art upon a reading of the following detailed description in conjunction with the drawings wherein there is shown and described illustrated embodiments of the invention.

BRIEF DESCRIPTION OF THE DRAWINGS

FIG. 8 is an exploded view of an embodiment of the present invention depicting how the parts of the present invention are interconnected.

FIG. 9 is a bottom view of the base of the present invention.

FIG. 10 is an isometric view of the present invention having a cap connected to a pole and a bird toy hanging from a set screw.

DESCRIPTION OF THE PREFERRED EMBODIMENTS

Figure 1:
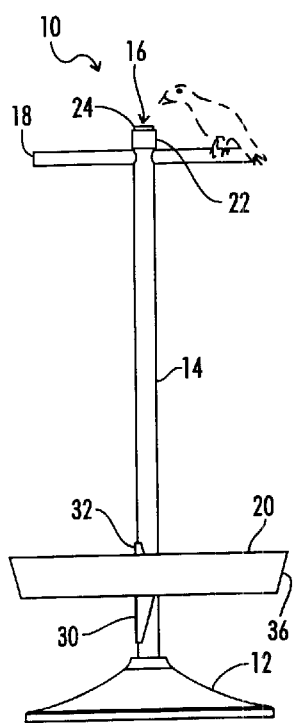
FIG. 1 is a side view of the present invention having a small feeder, large perch bar, and a catch pan connected to a lower portion of a pole.
Figure 2:
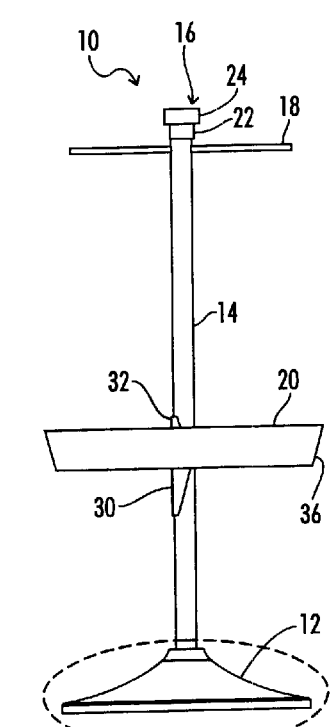
FIG. 2 is a side view of the present invention having a large feeder, small perch bar, and a catch pan connected in the middle of a pole.
Figure 3:
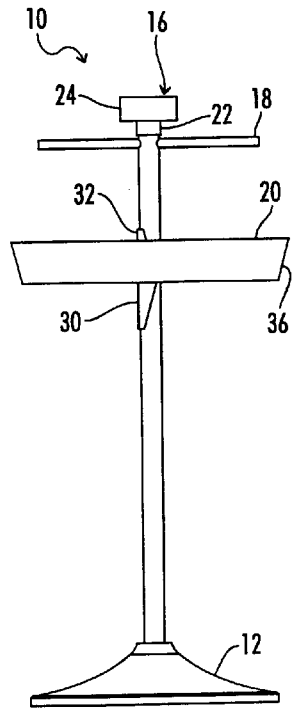
FIG. 3 is a side view of the present invention having a bird bathtub, medium perch bar, and a pan connected to an upper portion of a pole.
Figure 4:
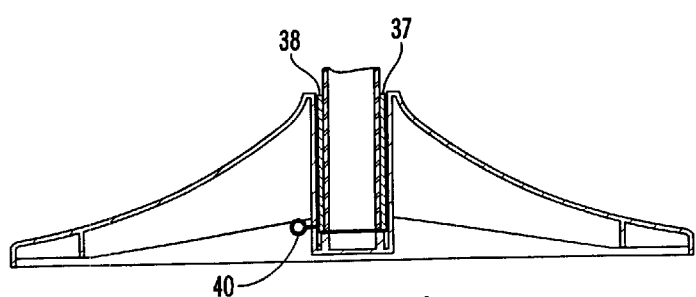
FIG. 4 is a cross-section view showing the manner of connection of the pole to the base.

Referring to FIG. 1, the bird perch, feeder, and bath 10 is comprised of a base 12, a pole 14 supported by the base 12, a feeder 16 mounted on top of the pole 14, a perch bar 18 attached to the pole 14 below the feeder 16, and a catch pan 20 attached to the pole 14 below the perch bar 18.

Referring to FIGS. 1 and 8, the feeder 16 is centrally located on top of the pole 14 and includes a lower portion 22 and an upper portion 24. The upper portion 24 is a circular-shaped open-topped cup and is used for holding bird feed and water. Although the upper portion 24 of the feeder 16 is described as circular, other shapes may be used as well. The lower portion 22 is used to connect the feeder 16 to the pole 14. The feeder 16 is connected to the pole 14 by sliding the lower portion 22 of the feeder 16 over the pole 14. The lower portion 22 and the upper portion 24 are made out of PVC piping; however, other materials could be used as well. The diameter of the PVC piping used to make the lower portion 22 may be smaller than the diameter of the PVC piping used to make the upper portion 24.

The upper portion 24 of the feeder 16 may come in various sizes. Generally, the upper portion 24 may have a diameter ranging from 1 inch to 4 inches. In some embodiments, the upper portion 24 may have a diameter greater than 4 inches. The size of the upper portion 24 is determined by the size of the bird expected to use the invention. For example, large birds would require large upper portions for holding more bird feed while small birds would require small upper portions for holding less bird feed. The size of the lower portion 22 may not vary with the size of the bird expected to use the invention.

Additionally, a smaller bird may use a large upper portion 24 as a birdbath. Generally, an upper portion 24 having a diameter of more than 4 inches should be sufficient. To accomplish this, one simply fills the upper portion 24 of the feeder 16 with water rather than bird feed.

Figure 5:
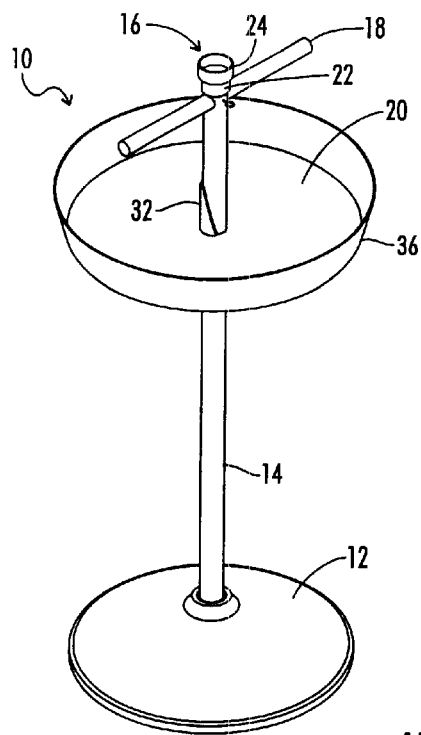
FIG. 5 is an isometric view of the present invention having a large feeder, large perch bar, and a catch pan connected to an upper portion of a pole.
Figure 6:
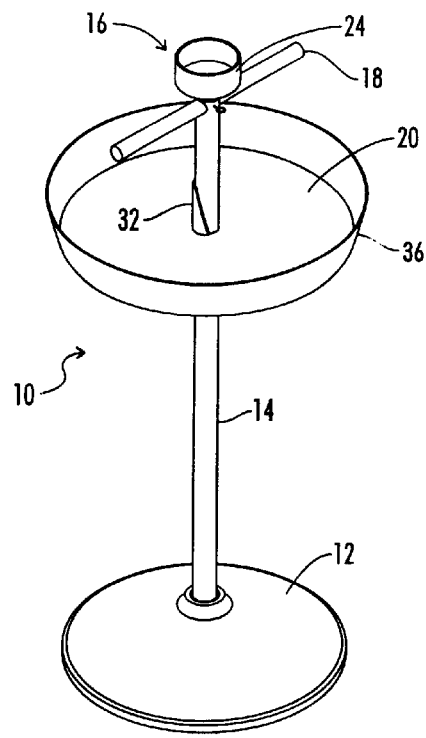
FIG. 6 is an isometric view of the present invention having a bird bathtub, large perch bar, and a catch pan connected to an upper portion of a pole.
Figure 7:
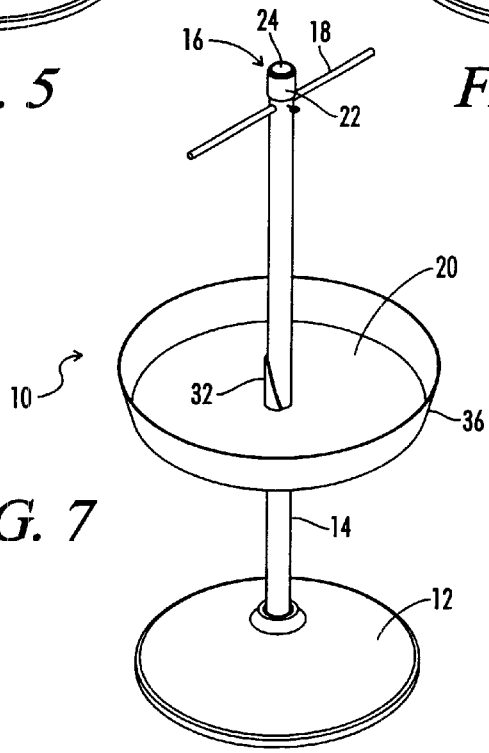
FIG. 7 is an isometric view of the present invention having a small feeder, small perch bar, and a catch pan connected to a lower portion of a pole.

In a preferred embodiment, the feeder 16 is available in three sizes: small, large, and bird bathtub size. The small feeder 16 (FIG. 7) includes a lower portion 22 and upper portion 24 that are unconnected. The large feeder 16 (FIG. 5) and bird bathtub 16 (FIG. 6) include a lower portion 22 and upper portion 24 that are connected together.

The small feeder 16 is made using a commercially available 1-inch diameter PVC cap (upper portion 24) and a 1¼ inch PVC coupling (lower portion 22). The small feeder 16 is connected to the pole 14 by placing the lower portion 22 onto the pole and placing the upper portion 24 into the lower portion 22.

The large feeder 16 is made by using PVC cement to connect a commercially available 2 inch diameter PVC cap (upper portion 24) and a 1¼ inch PVC cap (lower portion 22). The large feeder 16 is connected to the pole 14 by sliding the lower portion 22 over the pole 14.

The bird bathtub 16 is made by using PVC cement to connect a commercially available 4 inch diameter PVC cap (upper portion 24) and a 1¼ inch PVC cap (lower portion 22). The bird bathtub 16 is connected to the pole 14 by sliding the lower portion 22 over the pole 14.

Referring to FIG. 8, the pole 14 has an opening 26 and is generally cylindrical in shape. In a preferred embodiment, the pole 14 is made out of Schedule 40, 1¼ inch PVC piping. The pole 14 may be made out of other materials as well.

Referring to FIG. 10, a cap 44 is slide over the top of the pole 14 and secured to the pole 14 by a set screw 46 when the feeder 16 is disconnected from the pole 14. A bird toy 48 may be connected to the set screw 46 for birds using the invention. The cap 44 prevents birds from damaging the top of the pole 14 when the feeder 16 is disconnected from the pole 14. In a preferred embodiment, the cap is a Schedule 40, 1¼ inch PVC cap. Both the 1¼ inch PVC cap and the set screw are commercially available parts. The bird toy 48 may be any suitable type of bird toy commercially available at pet stores.

The perch bar 18 is connected to the pole 14 by sliding the perch bar 18 through the opening 26 until the perch bar 18 is centered over the pole 14, and then tightening a set screw 28 until the set screw 28 engages the perch bar 18. The perch bar 18 is generally a cylindrical rod but other shapes may be used. The perch bar 18 may have different diameters and lengths. The diameter and length is determined by the size of the bird expected to use the perch bar 18. Common diameters for the perch bar would be in the range from 0.5 inches to 2 inches. In a preferred embodiment, the perch bar 18 is made out wood; however, the perch bar 18 may be made out of other materials as well. The set screw 28 is of the conventional type found at a local hardware store.

Referring again to FIGS. 1 and 8, the catch pan 20 is detachably attached to the pole 14 using a first katchit clip 30 positioned below the catch pan 20 and a second katchit clip 32 positioned above the catch pan 20. The katchit clips are connected to the pole 14 by pressing each katchip clip against the pole 14 until the katchit clip snaps into place. In a preferred embodiment, katchip clip 30 and katchit clip 32 are made out of Schedule 40, 1½ inch PVC piping that has been cut into two separate pieces. A piece of PVC piping having a length of three and one-half (3½) inches is cut into two pieces; one piece forming katchit clip 30 and the second piece forming katchit clip 32. The PVC piping is cut along a line extending from one side of one end of the PVC piping to the opposite side of the other end of the PVC piping. Although the katchit clips 30 and 32 are used to support the catch pan 20 in a preferred embodiment, any adjustable support means may be used for holding the catch pan 20 at a fixed position on the pole 14.

The catch pan 20 is generally bowl-shaped and has a central opening 34 that is sized to pass over the pole 14. In a preferred embodiment, the catch pan 20 is made out of a plastic material. The catch pan 20 may be made out of other materials as well. The catch pan 20 has a radius 21 and a catch pan wall 36. The radius 21 should be substantially greater than the largest diameter of the feeder 16 to ensure that the catch pan 20 collects substantially all of the bird feed, waste and water falling from the perch bar 18. Generally, a radius 21 of approximately 9 and one-half inches (9½) inches should be sufficient. The catch pan wall 36 is sized so that bird feed, waste, and water falling down from the perch bar 18 cannot bounce or splash out of the catch pan 20. Generally the catch pan wall 36 may have a height of two and three-fourths (2¾) inches or more.

The location of the catch pan 20 on the pole 14 is determined by the size of the bird using the bird perch, feeder, and bath. For example, for larger birds, the catch pan 20 would be adjusted to a lower position on the pole 14; for smaller birds, the catch pan 20 would be located higher on the pole 14.

Referring to FIG. 8 the base 12 is generally circular and has a base opening 42 that is sized to receive the pole 14. In a preferred embodiment, the base 12 is made out of a plastic material; however, other materials may be used as well.

Referring again to FIG. 8, the pole 14 is detachably connected to the base 12 using a first spacer 37, a second spacer 38, and a set screw 40. The spacers, 37 and 38, are connected to the pole 14 using PVC cement. In a preferred embodiment, spacer 37 and spacer 38 are made out of Schedule 40, 1½ inch PVC piping that has been cut into two separate pieces. A piece of PVC piping having a length of three and one-half (3½) inches is cut into two pieces; one piece forming spacer 37 and the second piece forming spacer 38. The PVC piping is cut along a line extending from the middle of one end of the PVC piping to the middle of the other end of the PVC piping. The pole 14 and spacers 37 and 38 are slid into the base opening 42 and secured in place by tightening the set screw 40. In another preferred embodiment, the pole 14 is permanently connected to the base 12.

The present invention provides a method by which a person may enjoy the company of their pet bird, or a wild bird for that matter, without having the mess that usually accompanies such activity. The present invention is used in the following manner.

A person connects spacer 37 and spacer 38 to the pole 14 using PVC cement. The pole 14, and the spacers 37 and 38, are inserted into the base opening 42 and secured into place by tightening the set screw 40. Next, the katchit clip 30 is snapped onto the pole 14 at a desired position. The catch pan 20 is lowered down onto the pole until the catch pan 20 rests against the katchit clip 30. The katchit clip 32 is snapped onto pole 14 immediately above the catch pan 20 so that the katchit clip 32 contacts the catch pan 20. The catch pan 20 is effectively held in place on the pole 14 by the two katchit clips 30 and 32. The position of the catch pan 20 may be adjusted by moving the katchit clips 30 and 32.

The perch bar 18 is inserted into the opening 26 until the perch bar 18 is centered over the pole 14. The perch bar 18 is prevented from rolling or sliding out of the opening 26 by the set screw 28, which is tightened against the perch bar 18. The feeder 16 is connected to the pole 14 by sliding the lower portion 22 of the feeder 16 onto the pole 14. Bird feed or water may be placed into the feeder.

At this point, the invention is ready to be used by a bird. After a bird arrives and begins using the present invention, bird feed and bird waste are deposited in the catch pan 20. At some point in time, determined by the subjective desires of the person using the invention, a sufficient amount of bird feed and waste is collected in the catch pan 20 and must be removed. The catch pan 20 is removed in the following manner.

The feeder 16 is removed from the pole 14 by sliding the lower portion 22 of the feeder 16 off of the pole. The perch bar 18 is removed by loosening and removing the set screw 28 and sliding the perch bar 18 out of the opening 26. The katchit clip 32 is removed from the pole 14 by pulling the katchit clip 32 away from the pole 14 until the katchit clip 32 snaps off of the pole 14. Finally, the catch pan 20 is slid up and off the pole 14.

At this time, the catch pan 20 can be replaced with a new catch pan 20. Alternatively, the person using the present invention may decide to clean the catch pan 20 using a conventional cleaning method. Regardless of which alternative a person uses, the invention can be reassembled in the following manner.

The catch pan 20 is slid over the pole 14 until it rests against the katchit clip 30. The katchit clip 32 is snapped onto the pole 14 immediately above the catch pan 20 so that the katchit clip 32 contacts the catch pan 20. The perch bar 18 is slid through the opening 26 until it is centered over the pole 14. The perch bar 18 is fixed in this position by replacing and tightening set screw 28. The feeder 16 is reconnected to the pole 14 by sliding the lower portion 22 of the feeder 16 onto the pole.

The present invention provides a unique combination perch, feeder, and bath. The present invention is easy to use and made out of inexpensive conventional readily available parts. The invention provides an apparatus and a method of use that allows a person to enjoy the company of birds while eliminating the mess that usually accompanies such an activity.

Thus, it is seen that the apparatus and methods of the present invention readily achieve those ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A bird perch, feeder, and bath, comprising:
    a base;
    a pole supported by the base;
    a feeder mounted on top of the pole;
    a perch bar attached to the pole below the feeder;
    a catch pan attached to the pole below the perch bar, the catch pan having a central opening through which the pole is closely received;
    a first support member located above the catch pan and detachably attached to the pole to support the catch pan at a selected position on the pole; and
    a second support member located below the catch pan and detachably attached to the pole to support the catch pan at a selected position on the pole.

2. The apparatus of claim 1, wherein the first support member comprises a collar closely received about the pole.

3. The apparatus of claim 1, wherein the second support member comprises a collar closely received about the pole.

4. A bird perch, feeder, and bath, comprising:
    a base;
    a pole supported by the base;
    a feeder mounted on top of the pole;
    a perch bar attached to the pole below the feeder;
    a catch pan attached to the pole below the perch bar; and
    a cap removable connected to the pole for covering the top of the pole when the feeder is disconnected from the pole.

5. A bird perch, feeder, and bath apparatus, comprising:
    a base;
    a cylindrical pole supported by the base;
    a circular, open top feeder centrally mounted on top of the pole;
    a cylindrical perch bar, separate from and below the feeder, connected to the pole;
    a circular catch pan removable attached to the pole below the feeder;
    a first support member located above the catch pan and detachably attached to the pole to support the catch pan at a selected position on the pole; and
    a second support member located below the catch pan and detachably attached to the pole to support the catch pan at a selected position on the pole.

6. The apparatus of claim 5, wherein the first support member comprises a collar closely received about the pole.

7. The apparatus of claim 5, wherein the second support member comprises a collar closely received about the pole.

8. A method for cleaning a catch pan, which comprises:
    (a) providing a feeder, perch bar, catch pan, and pole;
    (b) removing the feeder from the pole;
    (c) removing the perch bar from the pole by loosening and removing a set screw and sliding the perch bar out of the pole;
    (d) removing the catch pan from the pole;
    (e) the bird feed and waste deposited on the pan;
    (f) replacing the catch pan on the pole;
    (g) replacing the perch bar in the pole;
    (h) replacing the feeder on the pole.

* * * * *